United States Patent
Keplinger et al.

(10) Patent No.: US 12,278,572 B2
(45) Date of Patent: Apr. 15, 2025

(54) COMPOSITE LAYERING OF HYDRAULICALLY AMPLIFIED SELF-HEALING ELECTROSTATIC TRANSDUCERS

(71) Applicant: The Regents of the University of Colorado, Denver, CO (US)

(72) Inventors: Christoph Matthias Keplinger, Gerlingen (DE); Shane Karl Mitchell, Boulder, CO (US); Nicholas Alexander Kellaris, Boulder, CO (US); Philipp Rothemund, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 796 days.

(21) Appl. No.: 17/436,455

(22) PCT Filed: Mar. 4, 2020

(86) PCT No.: PCT/US2020/020978
§ 371 (c)(1),
(2) Date: Sep. 3, 2021

(87) PCT Pub. No.: WO2020/180982
PCT Pub. Date: Sep. 10, 2020

(65) Prior Publication Data
US 2022/0158570 A1 May 19, 2022

Related U.S. Application Data

(60) Provisional application No. 62/813,266, filed on Mar. 4, 2019.

(51) Int. Cl.
*H02N 1/00* (2006.01)
*H02N 1/08* (2006.01)

(52) U.S. Cl.
CPC ............ *H02N 1/002* (2013.01); *H02N 1/006* (2013.01); *H02N 1/08* (2013.01)

(58) Field of Classification Search
CPC .......... H02N 1/00; H02N 1/002; H02N 1/006; H02N 1/06; H02N 1/08
See application file for complete search history.

(56) References Cited

U.S. PATENT DOCUMENTS

| 3,770,102 A | 11/1973 | De |
| 4,273,239 A | 6/1981 | Thwaites et al. |

(Continued)

FOREIGN PATENT DOCUMENTS

| EP | 2993480 A1 | 3/2016 |
| EP | 3988450 A1 | 4/2022 |

(Continued)

OTHER PUBLICATIONS

Acome et al, Supplemental Materials for Hydraulically Amplified Self-Healing Electrostatic Actuators With Muscle-Like Performance, Science, 359, Jan. 5, 2018 (Year: 2018).*

(Continued)

*Primary Examiner* — Eric Johnson
(74) *Attorney, Agent, or Firm* — NOD Law PC (57) ABSTRACT

A hydraulically amplified self-healing electrostatic (HASEL) transducer includes a composite, multi-layered structure. In an example, a HASEL transducer includes a dielectric layer including at least one fluid dielectric layer. The dielectric layer includes a first side and a second side opposing the first side. The HASEL transducer further includes a first electrode disposed at the first side of the dielectric layer, a second electrode disposed at the second side of the dielectric layer, a first outer layer disposed at the first electrode opposite the dielectric layer, and a second outer layer disposed at the second electrode opposite the (Continued)

dielectric layer. The first outer layer and second outer layer exhibit different mechanical and electrical properties from the dielectric layer.

19 Claims, 7 Drawing Sheets

(56) References Cited

U.S. PATENT DOCUMENTS

| | | | |
|---|---|---|---|
| 4,502,593 A | 3/1985 | Goor | |
| 5,581,192 A | 12/1996 | Shea et al. | |
| 5,846,238 A | 12/1998 | Jackson et al. | |
| 5,853,411 A | 12/1998 | Whayne et al. | |
| 5,871,483 A | 2/1999 | Jackson et al. | |
| 5,891,135 A | 4/1999 | Jackson et al. | |
| 6,223,888 B1 | 5/2001 | Jahns | |
| 6,626,416 B2 | 9/2003 | Sharma et al. | |
| 6,806,621 B2 | 10/2004 | Heim et al. | |
| 7,046,497 B1 | 5/2006 | Bonin | |
| 7,667,946 B2 | 2/2010 | Choi et al. | |
| 7,841,461 B2 | 11/2010 | Nguyen et al. | |
| 8,408,384 B2 | 4/2013 | Rogers | |
| 8,410,695 B1 | 4/2013 | Wedding et al. | |
| 10,302,586 B2 | 5/2019 | Sun et al. | |
| 10,631,083 B1 | 4/2020 | Gandhi et al. | |
| 10,640,033 B1 | 5/2020 | Gandhi et al. | |
| 10,859,101 B2 | 12/2020 | Rowe | |
| 10,995,779 B2 | 5/2021 | Keplinger et al. | |
| 11,408,452 B2 | 8/2022 | Keplinger et al. | |
| 2007/0170431 A1 | 7/2007 | Choi et al. | |
| 2009/0115285 A1 | 5/2009 | Najafi et al. | |
| 2010/0033196 A1 | 2/2010 | Hayakawa et al. | |
| 2010/0087778 A1 | 4/2010 | Genosar et al. | |
| 2014/0004364 A1 | 1/2014 | Takahashi et al. | |
| 2014/0338458 A1 | 11/2014 | Wang et al. | |
| 2018/0159022 A1 | 6/2018 | Krause et al. | |
| 2019/0020288 A1 | 1/2019 | Mäkinen et al. | |
| 2020/0079245 A1 | 3/2020 | Rowe et al. | |
| 2020/0130202 A1* | 4/2020 | Gandhi | B25J 9/065 |
| 2020/0132223 A1 | 4/2020 | Prokhorov et al. | |
| 2020/0136525 A1 | 4/2020 | Gandhi et al. | |
| 2020/0136526 A1* | 4/2020 | Gandhi | H02N 1/006 |
| 2020/0182269 A1* | 6/2020 | Rowe | F15B 15/10 |
| 2020/0256357 A1* | 8/2020 | Rowe | F15B 15/10 |

FOREIGN PATENT DOCUMENTS

| | | |
|---|---|---|
| WO | 2018175741 A1 | 9/2018 |
| WO | 2019166635 A1 | 9/2019 |
| WO | 2022050997 A9 | 4/2022 |
| WO | 2022050997 A3 | 6/2022 |

OTHER PUBLICATIONS

Sritharan et al, Fabrication of a Miniature Paper-Based Electroosmotic Actuator, Polymers, pp. 1-23, Nov. 15, 2016 (Year: 2016).*

Lazo, Thomas E., "Notice of Allowance for U.S. Appl. No. 17/883,284," Mailing Date Jun. 13, 2023, 5 Pages.

Mitchell, et al.; An Easy-to-Implement Toolkit to Create Versatile and High-Performance HASEL Actuators for Untethered Soft Robots; Adv. Sci.; 2019, 6, 1900178.

Schunk, et al.; System Identification and Closed Loop Control of a Hydraulically Amplified Self-Healing Electrostatic (Hasel) Actuator; IEEE/RSJ Int'l. Conf. on Intelligent Robots and Systems; Madrid, Spain; Oct. 1-5, 2018.

Acome, Eric et al., Hydraulically amplified self-healing electrostatic actuators with muscle-like performance, Science 359, pp. 61-65, (2018).

Extended European Search Report for European Application No. 19763827.3, Mailed Oct. 25, 2021.

International Preliminary Report on Patentability, PCT/US20/020978, Issued Aug. 25, 2021.

International Preliminary Report on Patentability, PCT/US20/020986, Issued Aug. 25, 2021.

International Search Report and Written Opinion for International Application No. PCT/US20/20978, Search completed May 7, 2020, Mailed Jun. 29, 2020, 18 Pgs.

International Search Report and Written Opinion, PCT/US21/35041, mailed Mar. 1, 2022.

Kellaris, Nicholas et al., Peano-Hasel actuators: Muscle-mimetic, electrohydraulic transducers that linearly contract on activation, Sci. Robot. 3, eaar 3276, (2018).

Notice of Allowance, U.S. Appl. No. 16/496,234, mailed Apr. 5, 2021.

Notice of Allowance, U.S. Appl. No. 16/978,292, mailed Feb. 25, 2022.

Notice of Allowance, U.S. Appl. No. 17/198,909, mailed Apr. 4, 2022.

Extended European Search Report for European Application No. 197638273, Mailed Oct. 28, 2021, 8 pages, Pub: DE.

International Search Report and Written Opinion for International Application No. PCT/US2019/20568, Mailed Jun. 21, 2019, 14 pages.

International Search Report and Written Opinion for International Application No. PCT/US2020/20978, Mailed Jun. 29, 2020, 18 pages.

Panwar, et al.; Simulation-driven design to reduce pull-in voltage of donut Hassel actuators; Proc. SPIE 10966; EAPAD XXI 1096622; Mar. 13, 2019, 9 pages.

Rothemund, et al.; Dynamics of electrohydraulic soft actuators; PNAS; vol. 117; No. 28; Jul. 14, 2020; pp. 16207-16213.

Wang et al.; High strain Peano-Hasel actuators; doi:10.1002/adfm.201908821; Dec. 15, 2019, 24 pages.

McMahon et al.; Area-of-Effect Softbots (AoES) for Asteroid Proximity Operations; IEEE, 2019.

* cited by examiner

COMPOSITE LAYERING OF HYDRAULICALLY AMPLIFIED SELF-HEALING ELECTROSTATIC TRANSDUCERS

CROSS-REFERENCE TO RELATED APPLICATIONS

The present application is a 371 national stage application of Interntional Application No. PCT/US2020/20978, entitled "COMPOSITE LAYERING OF HYDRAULICALLY AMPLIFIED SELF-HEALING ELECTROSTATIC TRANSDUCERS" and filed on Mar. 4, 2020, which claims the benefit of priority to U.S. Provisional Patent Application No. 62/813,266, entitled "FOLDABLE FILLING FABRICATION AND COMPOSITE LAYERING OF HYDRAULICALLY AMPLIFIED SELF-HEALING ELECTROSTATIC TRANSDUCERS" and filed on Mar. 4, 2019. Both aforementioned applications are expressly incorporated by reference herein for all that it discloses or teaches.

STATEMENT REGARDING FEDERALLY SPONSORED RESEARCH OR DEVELOPMENT

This invention was made with government support under grant number 80NSSC18K0962 awarded by NASA. The government has certain rights in the invention.

BACKGROUND

Hydraulically amplified self-healing electrostatic (HASEL) transducers have been shown to produce muscle-like actuation, as shown in the left portion of FIG. 1 and operate as soft generators as shown in the right portion of FIG. 1. A number of configurations of HASEL transducers have been proposed, such as those described in U.S. patent application Ser. No. 16/496,234 filed on 20 Sep. 2019 and entitled "HYDRAULICALLY AMPLIFIED SELF-HEALING ELECTROSTATIC ACTUATORS," PCT App. No. PCT/US2019/020568 filed on 4 Mar. 2019 entitled "HYDRAULICALLY AMPLIFIED SELF-HEALING ELECTROSTATIC TRANSDUCERS HARNESSING ZIPPING MECHANISM," U.S. Provisional Patent No. 62/886,820 filed 14 Aug. 2019 entitled "HYDRAULICALLY AMPLIFIED SELF-HEALING ELECTROSTATIC (HASEL) PUMPS," and U.S. Provisional App. No. 62/946,317 filed 10 Dec. 2019 entitled "HIGH STRAIN PEANO HYDRAULICALLY AMPLIFIED SELF-HEALING ELECTROSTATIC (HASEL) TRANSDUCERS," the entirety of each of the foregoing is hereby incorporated by reference.

Generally, HASEL transducers includes a dielectric fluid that is encapsulated by a dielectric shell, which is partially covered by electrodes. Moreover, HASELs have been demonstrated using a wide variety of materials, including stretchable elastomers, flexible yet inextensible thin-film polymers, ester oils, and electronic or ionic conductors. The performance of the transducer greatly depends on the electrical and physical properties of the dielectrics and electrodes. The use of dielectrics with high dielectric constants improves the performance of the transducer at lower voltages, while dielectrics with high dielectric strengths enable the use of high electric fields, which increases the overall performance of the transducer and improves reliability. Moreover, to avoid premature dielectric breakdown, it is advantageous for the dielectrics to be free of defects or imperfections. Also, the physical properties of the dielectrics (i.e., mechanical, chemical, thermal properties, etc.) are vital since these transducers may experience a wide range of (and possibly extreme) environmental conditions, such as high temperature, considerable mechanical stress, corrosive chemicals, and/or UV radiation.

While it has been recognized that HASEL transducers may provide independently tuned mechanical and electrical properties, previous examples of HASEL transducers may be limited as materials utilized for favorable electrical properties may not exhibit favorable physical or mechanical properties for transducers to be used in particular contexts. As such, the need exists for further improvement in HASEL transducers to facilitate more robust capability of HASEL transducers in a wide variety of applications.

SUMMARY

In view of the foregoing, it has been recognized that often materials that have favorable electrical properties (e.g., dielectric properties) lack desirable physical properties that may be desirable for transducers used in certain applications or environments. For instance, favorable materials for electrical properties may lack mechanical robustness that restricts the ability to use previous examples of HASEL transducers in all applications.

In turn, the present disclosure relates to HASEL transducers that include a composite structure. Different respective materials of the composite structure may impart different or unique beneficial characteristics or properties. Accordingly, a number of examples of HASEL transducers including a composite structure in which various materials are oriented to provide advantageous properties are presented herein. In particular, the composite structures described herein may leverage beneficial electrical properties (e.g., dielectric properties), while other materials may be included in the composite structure to provide advantageous mechanical or physical properties to the resulting composite transducer. In addition, a number of specific orientations for composite HASEL transducers are disclosed to provide an advantageous combination of favorable electrical and physical characteristics to a resulting transducer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

As illustrated in FIGS. 1A-1D, the structure of a portion of a HASEL transducer 10 can include a flexible but inextensible shell 12 segmented into at least one discrete pouch 20 that is each filled with a fluid dielectric 14. A first electrode 16 and a second electrode 18 may be disposed over the shell 12 of each pouch 20. First electrode 16 and second electrode 18 can be compliant or rigid, depending on the application. The portion of pouch 20 covered by first electrode 16 and second electrode 18 may be referred to as active area 30 while the uncovered portion (where contractile geometry change occurs during actuation of the transducer) may be referred to as inactive area 40.

In any case, the combination of pouch 20, fluid dielectric 14, first electrode 16, and second electrode 18 may be referred to as a unit 50. A transducer may have any appropriate number of interconnected units 50. In the example shown in FIGS. 1A and 1B, a weight 60 is attached to unit 50 via a string 62 around a pulley 64.

Figure 1A:
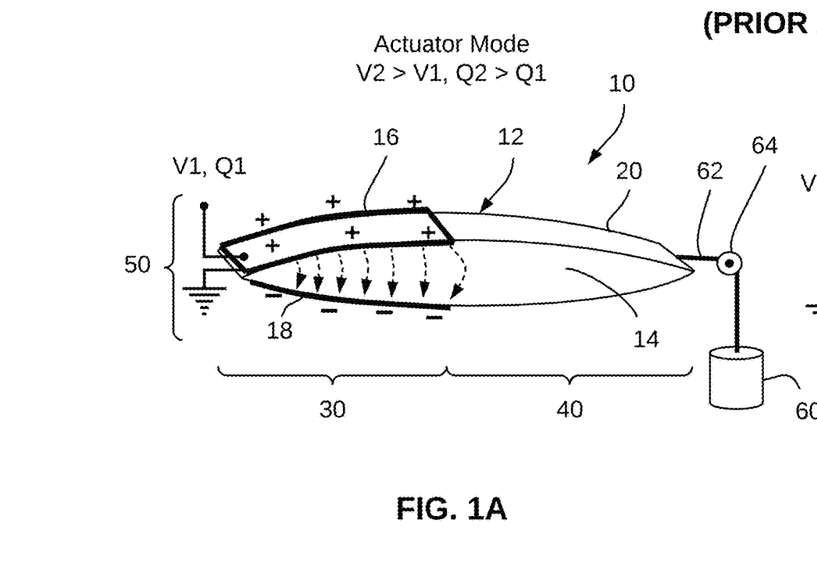
FIGS. 1A-1D depict a prior art example of a HASEL transducer that may be used in an actuator or generator mode.
Figure 1B:
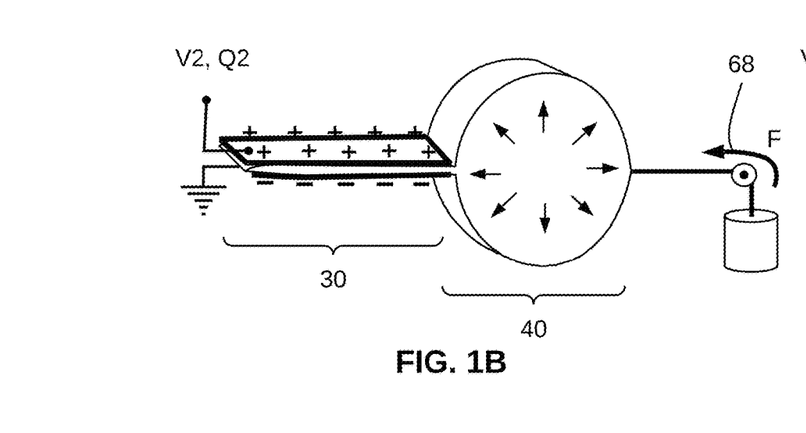

As an example, when an increasing voltage (V2>V1) is applied between first electrode 16 and second electrode 18 of unit 50 with a starting charge Q1 as shown in FIG. 1A, electrostatic forces displace fluid dielectric 14 causing first electrode 16 and second electrode 18 to progressively draw together and close, which forces fluid dielectric 14 from active area 30 into inactive areas 40, as shown in FIG. 1B. The movement of fluid dielectric 14 from active area 30 to inactive area 40 causes a transition from a relatively flat cross-section of inactive area 40 in FIG. 1A to a more circular one as shown in FIG. 1B, thus leading to a contractile force, F (as shown by an arrow 68). That is, because shell 12 is inextensible (i.e., non-elastic), inactive area 40 is forced to transition from a relatively flat cross-section in FIG. 1A to a more circular one as shown in the FIG. 1B.

Figure 1C:
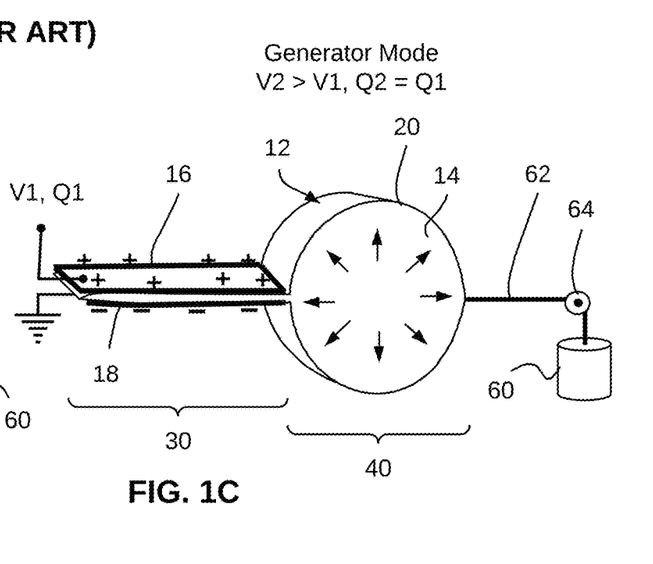
Figure 1D:
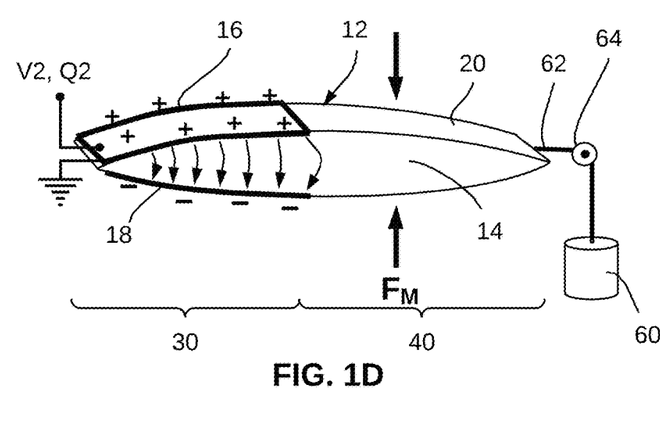

Alternatively, HASEL transducer 10 may be used in a generator mode, as shown in FIGS. 1C and 1D. The HASEL transducer is primed with electrical energy to close first electrode 16 and second electrode 18 to force fluid dielectric 14 into inactive area 40, as shown in FIG. 1C. Application of a mechanical force $F_M$ to the expanded inactive area 40 of HASEL transducer 10 forces fluid dielectric 14 between first electrode 16 and second electrode 18, thus converting the mechanical energy applied to HASEL transducer 10 to electrical energy (i.e., V2>V1, while charge Q1=Q2).

While an example of a form factor for a HASEL transducer is shown in FIGS. 1A-1D, it may be appreciated that the present disclosure may be used in any appropriate form factor, including any such transducer disclosed in any of the foregoing applications incorporated by reference above. Thus, the following disclosure generally describes composite transducer constructions, which may be used in any given form factor. Accordingly, while a portion of a transducer is shown in the following figures, it may be appreciated that the general structures described may be utilized in any appropriate form factor for a HASEL transducer without limitation.

Figure 2:
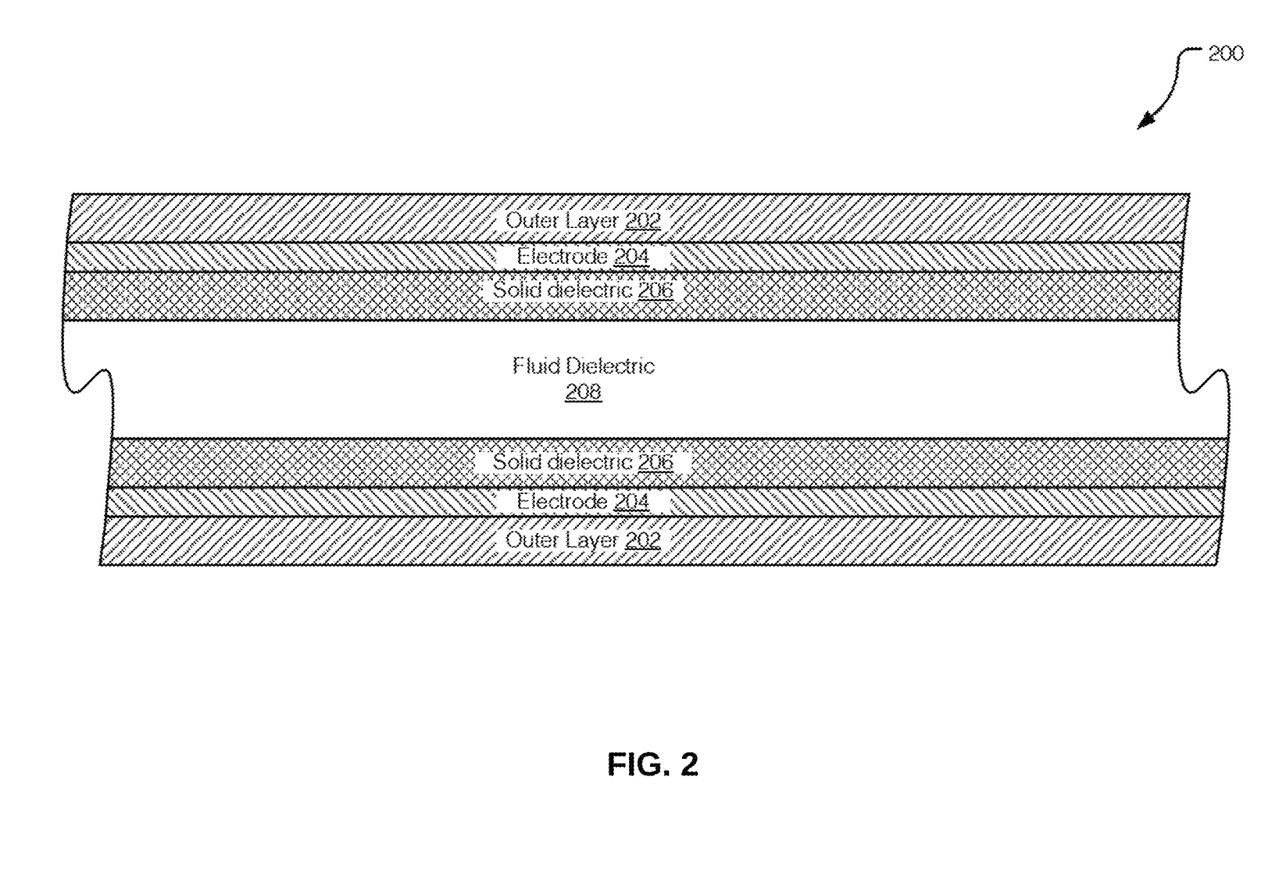
FIG. 2 depicts an example of a HASEL transducer including a composite structure.

FIG. 2 shows an example of a cross-section of an example construction for a HASEL transducer 200 with a composite structure. In FIG. 2, electrodes 204 are disposed adjacent to a solid dielectric layer 206. In turn, solid dielectric layer 206 encapsulates a fluid dielectric 208. An outer layer 202 is attached to a side of each electrode 204 opposite solid dielectric layer 206. Because solid dielectric 206 and fluid dielectric 208 are between electrodes 204, these are the only layers affected by the applied electric field in the illustrated example. Thus, the electrical properties of inner solid dielectric 206 and fluid dielectric 208 can be tuned for the most effective electromechanical energy conversion regardless of their physical characteristics. Additionally, the physical characteristics (chemical resistance, mechanical robustness, etc.) of outer layer 202 can be tailored regardless of the electrical properties of such materials. In an example, outer layer 202 may include a polymeric layer.

Figure 3:
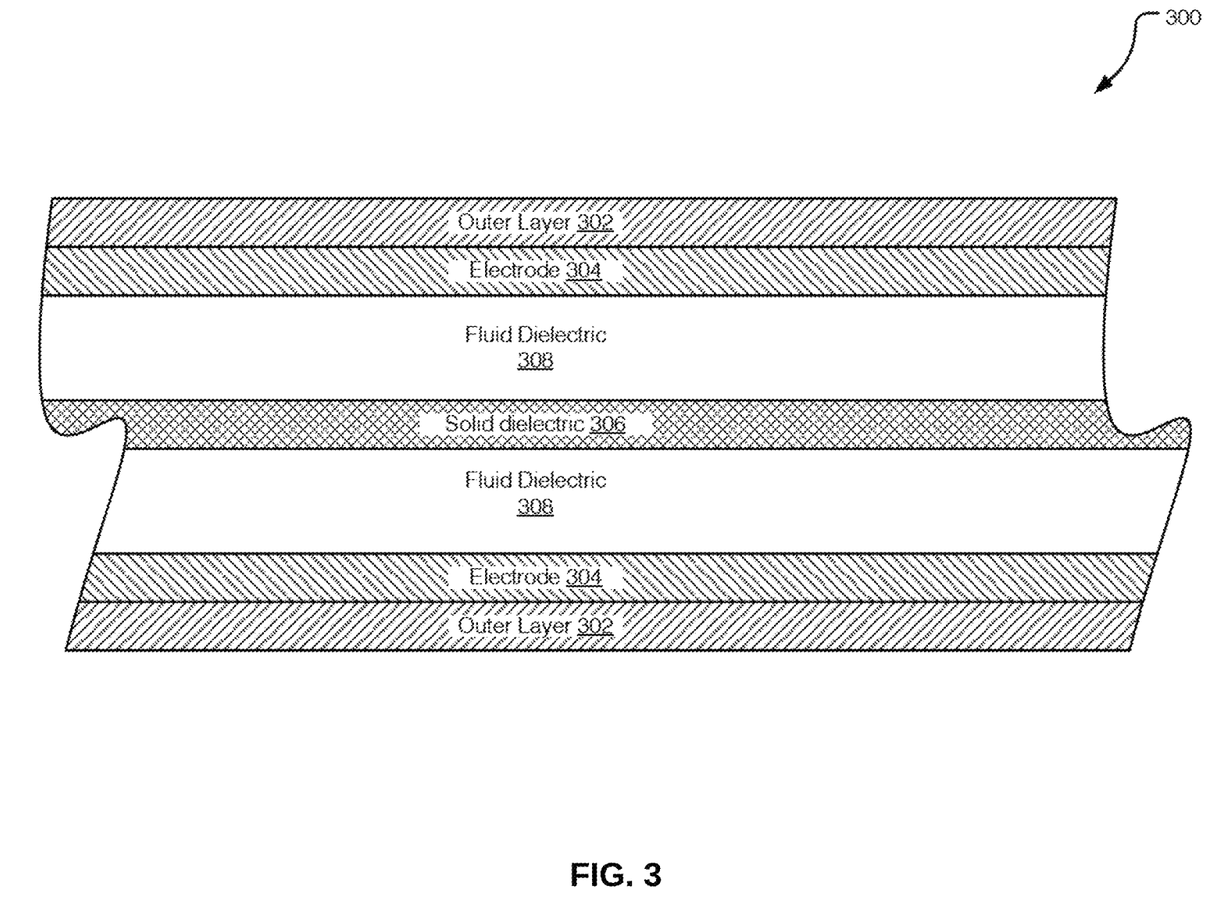
FIG. 3 depicts another example of a HASEL transducer including a composite structure.

FIG. 3 shows another example of a composite structure for a HASEL transducer 300. In FIG. 3, in which electrodes 304 are positioned relative to fluid dielectric 308 such that electrodes 304 are directly exposed to fluid dielectric 308. Transducer 300 also includes a solid dielectric layer 306 between electrodes 304 that is positioned between respective fluid dielectric layers 308. As electrodes 304 are attracted to one another upon application of a voltage potential between electrodes 304, one or both of fluid dielectric layers 308 may be displaced. Solid dielectric layer 306 may preclude electrodes 304 from contacting in regions where fluid dielectric layer 308 has been displaced.

Figure 4:
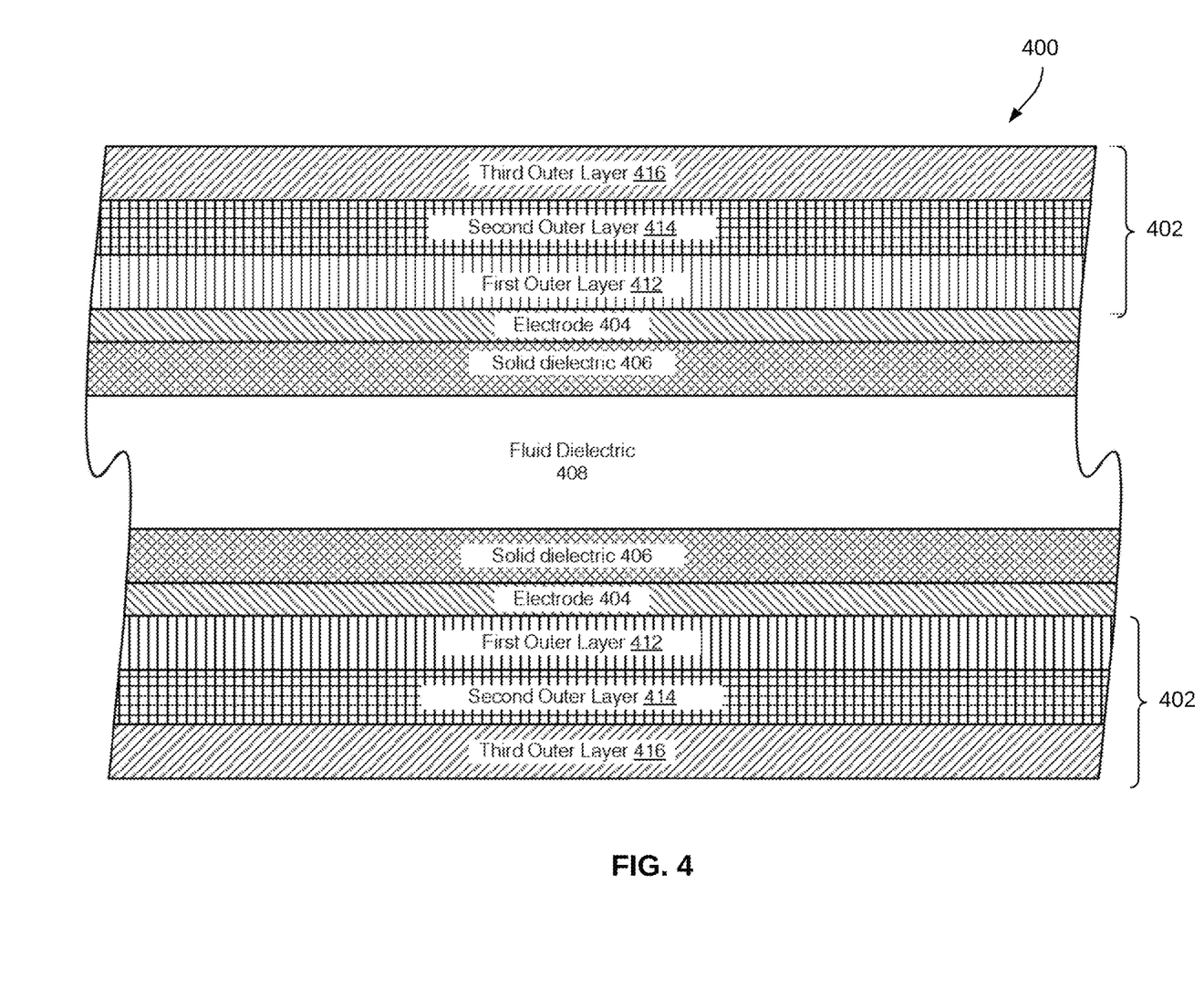
FIG. 4 depicts yet another example of a HASEL transducer including a composite structure

By constructing HASEL transducers with any of the example composite structures described herein, the transducers may be designed to offer excellent actuation performance, robustness, and durability. With reference to FIG. 4, another example of a composite structure for a HASEL transducer 400 is shown. In the example of IG. 4, an outer layer 402 is provided. Specifically, outer layer 402 may include multiple layers of different materials (e.g., different polymers) that may be used to tune the physical properties of the HASEL transducer. In FIG. 4, outer layer 402 includes a first outer layer 412, a second out layer 414, and a third outer layer 416. However, it should be appreciated that additional or fewer layers may be provided in outer layer 402. without limitation. In the example of HASEL transducer 400 shown in FIG. 4, first outer layer 412, second out layer 414, and third outer layer 416 may each exhibit different properties. For example, third outer layer 416 of outer layer 402 could be resistant to UV radiation and hydrophobic. In this regard, third outer layer 416 may be polytetrafluoroethylene (PTFE). Second outer layer 414 may be selected to provide high strength (e.g., tensile strength). As an example, second outer layer 414 may be a mesh of carbon fibers to provide high tensile strength. First outer layer 412 may be a thermally insulating layer. In this regard, first outer layer 412 may include a thermally insulating material such as polyimide. Alternative materials can be used for increased functionality as additions to the outer layers depicted in FIG. 4 as additional or alternative layers, such as a layer of Parylene C to provide high voltage insulation and humidity resistance or a polymer that can mechanically self-heal from damage. That is, the outer layers may be selected to provide desirable characteristics including, for example, radiation resistance, hydroaffinity (e.g., hydrophobic materials or hydrophilic materials), material strength, thermal insulation, dielectric constant, humidity resistance, or self-healing capability.

Figure 5:
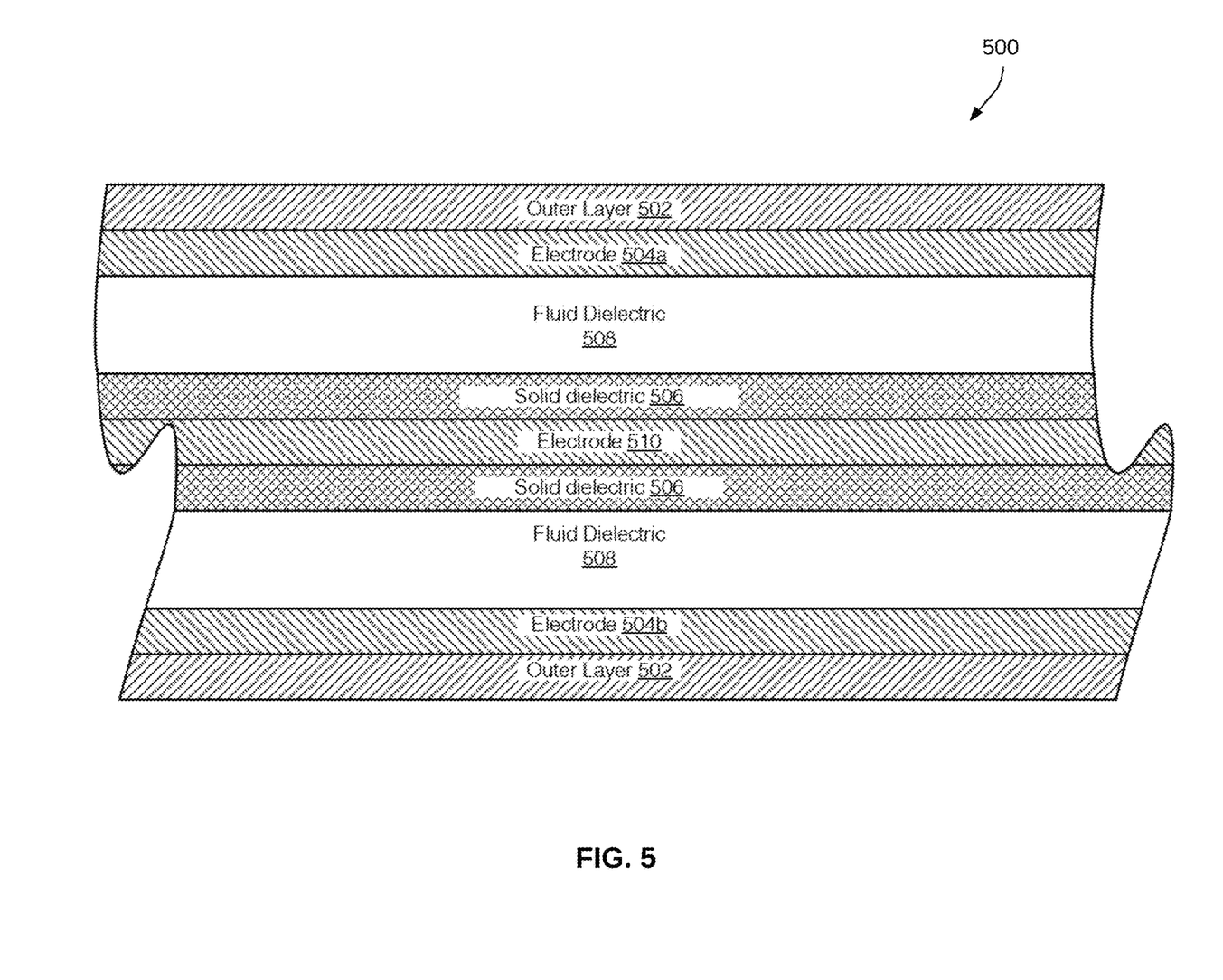
FIG. 5 depicts an example of a HASEL transducer including a composite structure in which independently operable transducer portions are defined for the variable performance of the transducer.

Additionally, the components of the composite structure (i.e., solid and fluid dielectrics, electrodes, polymer layers, etc.) can be ordered in different configurations for added functionality. FIG. 5 shows an example composite structure for a HASEL transducer 500, which includes nine layers. Specifically, HASEL transducer 500 includes a reference electrode 510. A solid dielectric layer 506 is provided on either side of reference electrode 510. To the exterior of solid dielectric layers 506, two discrete chambers of fluid dielectric 508 may be provided. Electrodes 504a and 504b may be provided to the outside of a fluid dielectric layer 508. In turn, a potential difference can be applied between electrode 504a and reference electrode 510 and/or between electrode 504b and reference electrode 510. That is, HASEL transducer 500 may be selectively operated to generate an electrostatic force acting on either discrete layer of fluid dielectric 508, respectively. The two discrete chambers of fluid dielectric 508 can have the same or different shapes and, therefore, the same or different functionality or transducer actuation mode. As an example, a first of fluid dielectric layers 508 may utilize materials and/or a geometry that causes the structure of HASEL transducer 500 to provide a bending transducer actuation mode upon activation. In contrast, the other of fluid dielectric layers 508 may utilize materials and/or a geometry that causes a linear expansion transducer actuation mode upon activation. Thus, activating both chambers simultaneously by applying a voltage potential between both electrode 504a and reference electrode 510 and between electrode 504b and reference electrode 510 may cause HASEL transducer 500 to bend and expand. Application of a voltage potential between a single one of electrodes 504 and reference electrode 510 may allow for individual ones of the actuation modes to be used. In summary, an anisotropic deformation across two fluid dielectric layers 508 can be achieved by using different activation voltages across each electrode pair or by using different pouch geometries on either side of reference electrode 510.

It is also possible to provide a transducer according to any of the foregoing examples in which the fluid dielectric layer includes a liquid dielectric, a gaseous dielectric, or a combination thereof. For example, in at least some examples, all of the fluid dielectric within a HASEL transducer may be a gaseous dielectric. The gas utilized for the gaseous dielectric may be any appropriate gas. For example, the gaseous dielectric may include air, Sulfur Hexafluoride (SF6), Nitrogen, Octafluorocyclobutane (R-C318), 1,2-Dichlorotetrafluoroethane (R-114), Dichlorodifluoromethane (R-12), Perfluorobutane (R-3-1-10), Perfluoropropane (R-218), Hexafluoroethane (R-116), or other gas. SF6 is advantageous as it provides a relatively higher breakdown voltage as compared to the other gases described. Regardless, any of the foregoing examples of HASEL transducers having a composite structure or any of the other HASEL transducer structures described in the materials incorporated by reference may include a working fluid that is a mixture of a liquid dielectric and a gaseous dielectric, entirely a liquid dielectric, or entirely a gaseous dielectric.

Incorporating a gaseous dielectric into the composite structure of HASEL transducers may be beneficial to reduce the overall weight of the structure of the transducer while maintaining the same or similar electromechanical performance. For instance, in one example contemplated herein a Peano-HASEL transducer with an internal volume filled with a mixture of liquid and gaseous dielectrics at about a ratio of 1:10 by volume. Such a transducer achieves a 70% weight reduction (e.g., the contemplated transducer weighs 1.4 grams as compared to 5 grams for an identical Peano-HASEL transducer with an internal volume filled with only liquid dielectric). Such a transducer having a mixture of liquid and gaseous dielectrics has been shown to lift a 50 grams weight. Moreover, the transducer with a mixture of liquid and gas dielectric demonstrates identical stress/strain performance as a transducer with just a liquid dielectric.

If a gaseous dielectric is used alone as the working fluid within the pouch, it is preferable that the gas has a dielectric strength that is a few times higher than that of air. For instance, SF6 provides such a high voltage breakdown, such that SF6 may be preferable to use in constructions having a gaseous only dielectric. In contrast, HASEL transducers that use only air as the working fluid demonstrate may demonstrate deteriorated performance relative to SF6 as the working fluid due to the relatively low dielectric strength of air. Thus, if air is used as the gaseous dielectric, it may be beneficial to maintain a thin layer of liquid dielectric between the electrodes of the transducer. This layer of liquid dielectric may be achieved by simply using a mixture of gas and liquid as the working fluid, even if the mixture is predominantly gas. Additionally or alternatively, the surfaces including the fluid dielectric inner volume may be designed with an oleophilic coating or a sponge-like elastomer that traps fluid dielectric between the electrodes to prevent premature dielectric breakdown of the gaseous dielectric within the inner volume.

Figure 6:
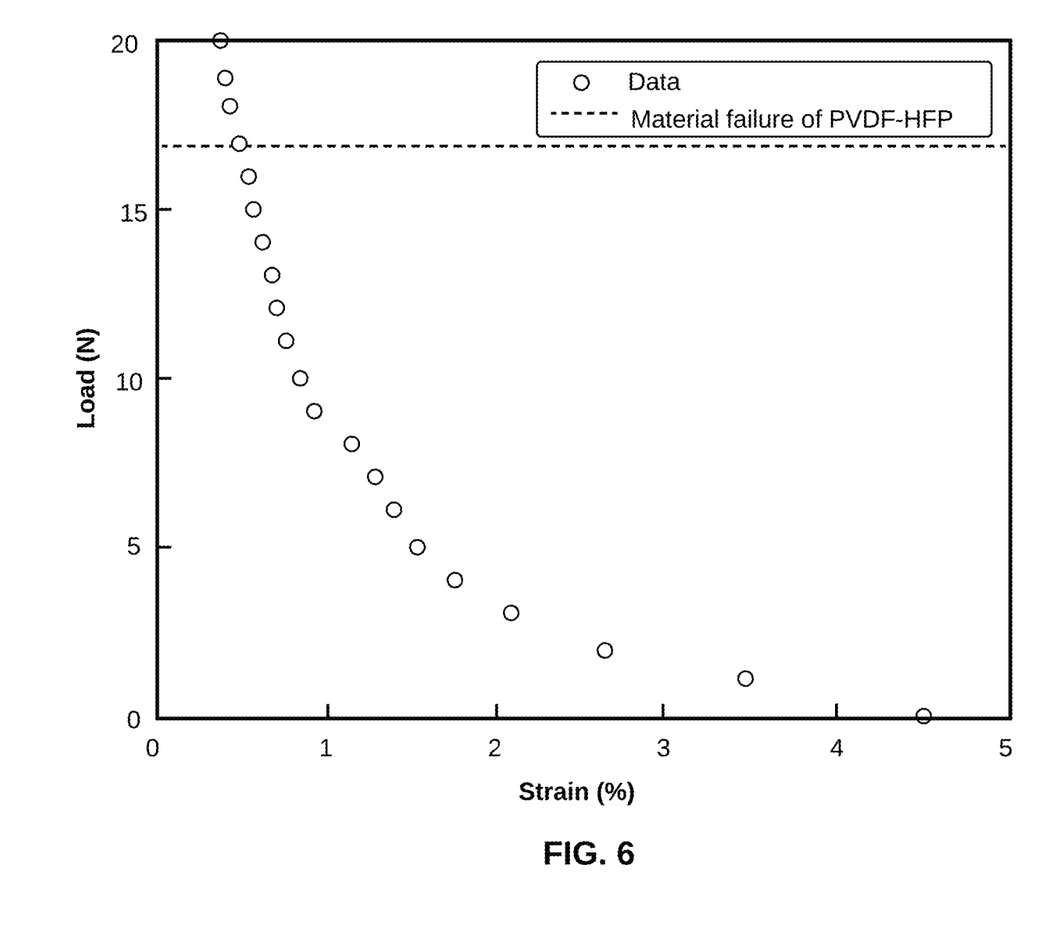
FIG. 6 depicts a load-strain curve for a transducer having a composite structure according to the present disclosure.

With further reference to FIG. 6, a load-strain plot of a composite transducer having a composite structure as shown and described above in relation to FIG. 2 is shown. In the example transducer whose behavior is shown in FIG. 6, the transducer is driven at 5 kV, and outer layer 202 on opposite sides of the transducer are 20 μm thick polyester film. Electrodes 204 are provided by vapor-deposited aluminum layers, which are each 150 nm thick. Solid dielectric 206 on opposite sides of fluid dielectric 208 are each 22 μm thick poly(vinylidene fluoride-co-hexafluoropropylene)(PVDF-HFP). Fluid dielectric layer 208 is vegetable-based transformer oil.

Transducer 200 in the example of FIG. 6 is a 5 cm wide and 1 cm long transducer. The PVDF-HFP film was chosen as solid dielectric 206 due to its excellent electrical properties, including a dielectric strength of 400 V/um and permittivity value of 25. The polyester film was chosen as outer layer 202 due to its high tensile strength. The load-strain plot in FIG. 6 shows that the composite actuator can withstand a higher tensile load than the pure PVDF-HFP film itself.

Figure 7:
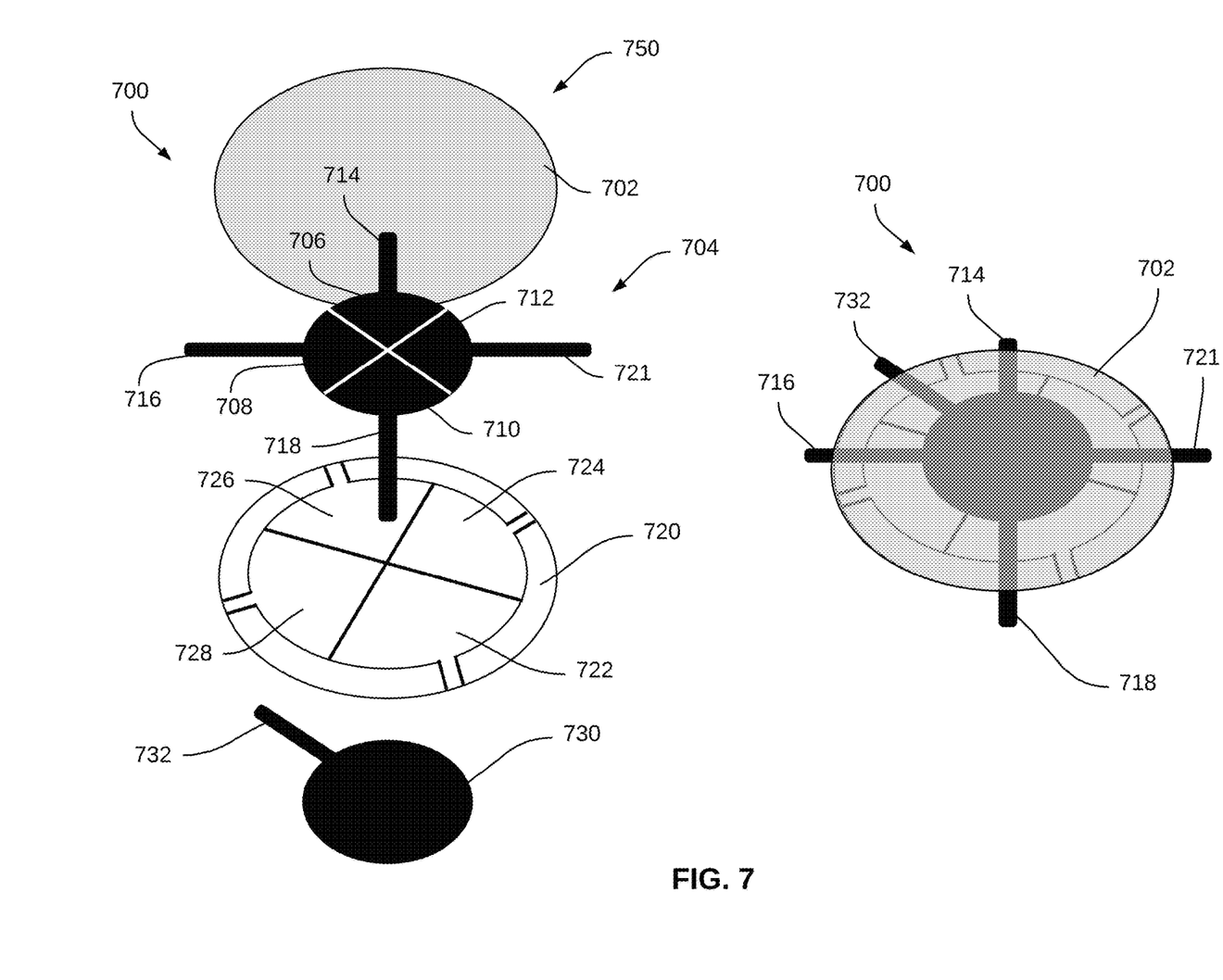
FIG. 7 illustrates an example configuration of a composite structure according to the present disclosure.

FIG. 7 illustrates an example of a transducer 700 shown in an exploded view 750 and an assembled view 760. As can be appreciated in exploded view 750, transducer 700 includes an insulating layer 702, a first electrode layer 704, a shell layer 720, and a second electrode layer 730. Second electrode layer 730 includes one electrode at a common voltage potential. In turn, shell layer 720 may be a heat-sealed shell that defines four discrete chambers 722, 724, 726, and 728 of fluidic dielectric therein. First electrode layer 704 includes four discrete top electrodes 706, 708, 710, and 712. Discrete electrode 706 is positioned relative to discrete chamber 726 and includes a voltage lead 714. Discrete electrode 708 is positioned relative to discrete chamber 728 and includes a voltage lead 716. Discrete electrode 710 is positioned relative to discrete chamber 722 and includes a voltage lead 718. Discrete electrode 712 is positioned relative to discrete chamber 724 and includes a voltage lead 721. Insulating layer 702 covers the top electrode layer 704. Specifically, insulating layer 702 has a high dielectric strength to prevent arching between the discrete electrodes of first electrode layer 704 when they are driven to high potential differences. The four discrete chambers of fluidic dielectric can be activated independently by respective ones of the discrete electrodes. Specifically, as shown in assembled view 760, each of voltage leads 714, 716, 718, and 720 may extend beyond the insulating layer 702. In addition, a voltage lead 732 of second electrode layer 730 may also extend beyond the insulating layer 702. In turn, a voltage potential across respective ones of the discrete electrodes and second electrode layer 730 may be established to create a potential difference applied across a top electrode and second electrode layer 730 to activate the corresponding chamber of the fluidic dielectric. This technique enables distributed systems of tightly packed HASEL transducers without arching between the electrodes of adjacent chambers.

The composite structures for transducers, as described above, may be manufactured using any appropriate technique. For instance, any one or more of the following techniques may be utilized: laminating solid layers via adhesives, thermal bonding, or other commonly used techniques, solution casting, co-extruding layers, selectively bonding in certain locations or fully bonding, chemical bonding (e.g., covalent, ionic, or Van der Waals bonding), physical bonding (e.g., including use of interlocking features). Furthermore, any of the foregoing layers described may itself could be a composite (fiber-glass reinforced tape, etc.).

Specifically, a layered composite structure is contemplated such that different ones of the layers are selected for electrical properties and physical properties, respectively. Specifically, combinations of fluid dielectric layers, solid dielectric layers, electrodes, and outer layers may be used. The fluid and solid dielectric layers may be selected for favorable electrical properties and the outer layers may be selected for beneficial physical properties. An example of a composite structure includes individually actuatable fluid dielectric volumes that may have different actuation modalities. Further still, transducers may be provided with gaseous dielectric, fluid dielectric, or a combination thereof. One general aspect of the present disclosure includes a HASEL transducer including a dielectric layer including at least one fluid dielectric layer. The dielectric layer includes a first side and a second side opposing the first side. A first electrode is disposed at the first side of the dielectric layer. A second electrode is disposed at the second side of the dielectric layer. A first outer layer disposed at the first electrode opposite the dielectric layer, and a second outer layer disposed at the second electrode opposite the dielectric layer. Properties of the first outer layer and second outer layer differ from the properties of the dielectric layer at least with respect to mechanical properties and electrical properties of the respective layers.

Implementations may include one or more of the following features. For example, the dielectric layer may also include a solid dielectric layer. The solid dielectric layer may include a first solid dielectric layer disposed between the fluid dielectric layer and the first electrode and a second solid dielectric layer may be disposed between the fluid dielectric layer and the second electrode.

In an example, the fluid dielectric layer includes a first fluid dielectric layer disposed between the solid dielectric layer and the first electrode and a second fluid dielectric layer disposed between the solid dielectric layer and the second electrode. A reference electrode may be disposed between the first fluid dielectric layer and the second fluid dielectric layer. In turn, a voltage potential may be applied independently between the first electrode and the reference electrode and the second electrode and the reference electrode to independently actuate a first transducer portion relative to the first fluid dielectric layer and a second transducer portion relative to the second fluid dielectric layer. The first transducer portion provides a first transducer actuation mode and the second transducer portion provides a second transducer actuation mode different from the first transducer actuation mode.

In an example, the fluid dielectric layer includes a gaseous dielectric. Alternatively, the fluid dielectric layer includes a fluid dielectric. Further still, the fluid dielectric layer may include a mixture of a gaseous dielectric and a fluid dielectric.

In an example, at least one of the first outer layer or the second outer layer include a composite material. For instance, at least one of the first outer layer or the second outer layer may include a first sublayer and a second sublayer. The first sublayer and the second sublayer include different respective physical properties. The different respective physical properties include respective ones of radiation resistance, hydroaffinity, material strength, thermal insulation, dielectric constant, humidity resistance, or self-healing capability.

Another general aspect of the present diclsoure includes a method of producing a HASEL transducer. The method includes providing a dielectric layer including at least one fluid dielectric layer. The dielectric layer includes a first side and a second side opposing the first side. The method also includes applying a first electrode to the first side of the dielectric layer and applying a second electrode disposed to the second side of the dielectric layer. The method also includes locating a first outer layer disposed at the first electrode opposite the dielectric layer and locating a second outer layer disposed at the second electrode opposite the dielectric layer. Properties of the first outer layer and second outer layer differ from the properties of the dielectric layer at least with respect to mechanical properties and electrical properties of the respective layers.

Implementations may include one or more of the following features. For example, the dielectric layer may include a solid dielectric layer. The method may include disposing a first solid dielectric layer between the fluid dielectric layer and the first electrode and a second solid dielectric layer between the fluid dielectric layer and the second electrode. The method may also include locating a first fluid dielectric layer between the solid dielectric layer and the first electrode and a second fluid dielectric layer between the solid dielectric layer and the second electrode. The method may further include including a reference electrode between the first fluid dielectric layer and the second fluid dielectric layer. As such, the method may include applying a voltage potential independently between the first electrode and the reference electrode and the second electrode and the reference electrode to independently actuate a first transducer portion relative to the first fluid dielectric layer and a second transducer portion relative to the second fluid dielectric layer. The method may include actuating the first transducer portion to achieve a first transducer actuation mode and actuating the second transducer portion to achieve a second transducer actuation mode different from the first transducer actuation mode.

In an example, the fluid dielectric layer includes a gaseous dielectric. In another example, the fluid dielectric layer includes a fluid dielectric. In another example, the fluid dielectric layer includes a mixture of a gaseous dielectric and a fluid dielectric.

In an example, at least one of the first outer layer or the second outer layer includes a composite material. For example, at least one of the first outer layer or the second outer layer further may include a first sublayer and a second sublayer. The first sublayer and the second sublayer includes different respective physical properties. The different respective physical properties include respective ones of radiation resistance, hydroaffinity, material strength, thermal insulation, dielectric constant, humidity resistance, or self-healing capability.

What is claimed is:

1. A hydraulically amplified self-healing electrostatic (HASEL) transducer, comprising:
   a dielectric layer comprising
   a first fluid dielectric layer,
   a second fluid dielectric layer, and
   a solid dielectric layer separating the first fluid dielectric layer from the second fluid dielectric layer,
   the dielectric layer comprising a first side and a second side opposing the first side;
   a first electrode disposed at the first side of the dielectric layer;
   a second electrode disposed at the second side of the dielectric layer;
   a first outer layer disposed at the first electrode opposite the dielectric layer;
   a second outer layer disposed at the second electrode opposite the dielectric layer;
   wherein properties of the first outer layer and second outer layer differ from the properties of the dielectric layer at least with respect to mechanical properties and electrical properties of the respective layers,
   wherein the first fluid dielectric layer is disposed between and adjacent to the solid dielectric and the first electrode,
   wherein the second fluid dielectric layer is disposed between and adjacent to the solid dielectric and the second electrode, and
   wherein the first and second fluid dielectric layers are configured such that at least one of the first and second fluid dielectric layers is displaced upon application of a voltage potential across the dielectric layer between the first and second electrodes.

2. The HASEL transducer of claim 1, wherein the solid dielectric layer comprises a first solid dielectric layer disposed between the first fluid dielectric layer and the first electrode and a second solid dielectric layer disposed between the second fluid dielectric layer and the second electrode.

3. The HASEL transducer of claim 1, further comprising:
   a reference electrode disposed between the first fluid dielectric layer and the second fluid dielectric layer; and
   wherein a voltage potential may be applied independently between the first electrode and the reference electrode and the second electrode and the reference electrode to independently actuate a first transducer portion relative to the first fluid dielectric layer and a second transducer portion relative to the second fluid dielectric layer.

4. The HASEL transducer of claim 3, wherein the first transducer portion provides a first transducer actuation mode and the second transducer portion provides a second transducer actuation mode different from the first transducer actuation mode.

5. The HASEL transducer of claim 1, wherein at least one of the first and second fluid dielectric layers comprises a gaseous dielectric.

6. The HASEL transducer of claim 1, wherein at least one of the first and second fluid dielectric layers comprises a fluid dielectric.

7. The HASEL transducer of claim 1, wherein at least one of the first and second fluid dielectric layers comprises a mixture of a gaseous dielectric and a fluid dielectric.

8. The HASEL transducer of claim 1, wherein at least one of the first outer layer and the second outer layer comprise a composite material.

9. The HASEL transducer of claim 1, wherein at least one of the first outer layer and the second outer layer further comprises:
   a first sublayer;
   a second sublayer; and
   wherein the first sublayer and the second sublayer comprise different respective physical properties.

10. The HASEL transducer of claim 9, wherein the different respective physical properties include at least one of radiation resistance, hydroaffinity, material strength, thermal insulation, dielectric constant, humidity resistance, and self-healing capability.

11. A method of producing a hydraulically amplified self-healing electrostatic (HASEL) transducer, comprising:
    providing a dielectric layer, the dielectric layer comprising
    a first fluid dielectric layer,
    a second fluid dielectric layer, and
    a solid dielectric layer separating the first fluid dielectric layer from the second fluid dielectric layer,
    the dielectric layer comprising a first side and a second side opposing the first side; applying a first electrode to the first side of the dielectric layer such that the first fluid dielectric layer is disposed between and adjacent to the solid dielectric and the first electrode;
    applying a second electrode disposed to the second side of the dielectric layer such that the second fluid dielectric layer is disposed between and adjacent to the solid dielectric and the second electrode;
    locating a first outer layer disposed at the first electrode opposite the dielectric layer; and
    locating a second outer layer disposed at the second electrode opposite the dielectric layer,
    wherein properties of the first outer layer and second outer layer differ from the properties of the dielectric layer at least with respect to mechanical properties and electrical properties of the respective layers, and
    wherein the first and second fluid dielectric layers are configured such that at least one of the first and second fluid dielectric layers is displaced upon application of a voltage potential across the dielectric layer between the first and second electrodes.

12. The method of claim 11, further comprising:
    including a reference electrode between the first fluid dielectric layer and the second fluid dielectric layer; and
    applying a voltage potential independently between the first electrode and the reference electrode and the second electrode and the reference electrode to independently actuate a first transducer portion relative to the first fluid dielectric layer and a second transducer portion relative to the second fluid dielectric layer.

13. The method of claim 12, further comprising:
    actuating the first transducer portion to achieve a first transducer actuation mode; and
    actuating the second transducer portion to achieve a second transducer actuation mode different from the first transducer actuation mode.

14. The method of claim 11, wherein providing the first and second fluid dielectric layers comprises providing a gaseous dielectric as at least one of the first and second fluid dielectric layers.

15. The method of claim 11, wherein providing the first and second fluid dielectric layers comprises providing a fluid dielectric as at least one of the first and second fluid dielectric layers.

16. The method of claim 11, wherein providing the first and second fluid dielectric layers comprises providing a mixture of a gaseous dielectric and a fluid dielectric as at least one of the first and second fluid dielectric layers.

17. The method of claim 11, wherein at least one of the first outer layer and the second outer layer comprise a composite material.

18. The method of claim 11, wherein at least one of the first outer layer and the second outer layer further comprises:
   a first sublayer;
   a second sublayer; and
   wherein the first sublayer and the second sublayer comprise different respective physical properties.

19. The method of claim 18, wherein the different respective physical properties include at least one of radiation resistance, hydroaffinity, material strength, thermal insulation, dielectric constant, humidity resistance, or self-healing capability.

* * * * *